United States Patent [19]
Yamaguchi

[11] Patent Number: 6,088,208
[45] Date of Patent: Jul. 11, 2000

[54] ELECTRONIC DEVICE, ELECTRONIC SWITCHING APPARATUS INCLUDING THE SAME, AND PRODUCTION METHOD THEREOF

[75] Inventor: Seiki Yamaguchi, Shiga-ken, Japan

[73] Assignee: Matsushita Electronics Corporation, Osaka, Japan

[21] Appl. No.: 09/050,145

[22] Filed: Mar. 30, 1998

[30] Foreign Application Priority Data

Mar. 31, 1997 [JP] Japan ................................. 9-080140

[51] Int. Cl.⁷ ........................................ H02H 5/04
[52] U.S. Cl. ............................................ 361/103
[58] Field of Search ................... 361/57, 88, 89, 361/93, 94, 103, 97–101; 330/289; 327/513; 323/313–317, 907

[56] References Cited

U.S. PATENT DOCUMENTS

| | | | |
|---|---|---|---|
| 3,701,004 | 10/1972 | Tuccinardi et al. | 323/69 |
| 4,574,205 | 3/1986 | Nagano | 307/310 |
| 4,760,434 | 7/1988 | Tsuzuki et al. | 257/356 |
| 4,896,199 | 1/1990 | Tsuzuki et al. | 257/356 |
| 5,039,878 | 8/1991 | Armstrong et al. | 323/907 |
| 5,336,943 | 8/1994 | Kelly et al. | 307/310 |
| 5,434,443 | 7/1995 | Kelly et al. | 257/467 |

FOREIGN PATENT DOCUMENTS

| | | | |
|---|---|---|---|
| 0 523 799 A1 | 1/1993 | European Pat. Off. | G01K 7/00 |
| 0 561 461 A2 | 9/1993 | European Pat. Off. | H01L 27/02 |
| 3321912 A1 | 12/1983 | Germany | G01K 7/00 |
| 44 37 461 A1 | 4/1996 | Germany | G01K 7/00 |
| 62-229866 | 10/1987 | Japan | H01L 23/56 |

*Primary Examiner*—Ronald W. Leja
*Attorney, Agent, or Firm*—Akin, Gump, Strauss, Hauer & Feld, L.L.P.

[57] ABSTRACT

An electronic device for temperature detection includes a variable threshold voltage that changes in a negative direction in accordance with a temperature change. A reference voltage varies in a positive direction in accordance with the temperature change. A control signal is generated when the reference voltage corresponding to a detection reference temperature and the threshold voltage become equal to each other.

14 Claims, 8 Drawing Sheets

PRIOR ART

ELECTRONIC DEVICE, ELECTRONIC SWITCHING APPARATUS INCLUDING THE SAME, AND PRODUCTION METHOD THEREOF

FIELD OF THE INVENTION

The present invention relates an electronic device, an electronic switching apparatus including the same, and a production method therefor. Specifically, the present invention relates to a temperature detecting electronic device including an electronic component for outputting a voltage changing in accordance with the temperature, an electronic switching apparatus including such a temperature detecting electronic device and having an overheating preventing function, and a method for producing such an electronic switching apparatus. In particular, the present invention relates to a temperature detecting electronic device including a MOS-type field effect transistor (hereinafter, referred to as a "MOSFET"), an electronic switching apparatus including such a temperature detecting electronic device and having an overheating preventing function, and a method for producing such an electronic switching apparatus.

DESCRIPTION OF THE RELATED ART

FIG. 7 is an equivalent circuit diagram of a conventional electronic switching apparatus having an overheating preventing function. The electronic switching apparatus includes a diode group 1 having six diodes connected in series, a power supply line 2, a resistor 3, a power switch 5 formed of a MOSFET, and a gate blocking MOSFET 6.

An anode electrode of the uppermost diode of the diode group 1 is connected to the power supply line 2. In general, the power supply line 2 is connected to an external power supply and thus has a very small temperature coefficient. Even in the case where a voltage supply is provided within the electronic switching apparatus, the power supply line 2 is formed to have a small temperature coefficient.

One of two electrodes of the resistor 3 is connected to a cathode electrode of the lowermost diode of the diode group 1, and the other electrode of the resistor 3 is connected to a GND line. A temperature detecting electronic device 4 includes the diode group 1 and the resistor 3. A voltage at the connection point between the lowermost diode of the diode group 1 and the resistor 3 is output to an element in the subsequent stage as an output signal. In this example, the temperature detecting electronic device 4 is designed to detect a temperature of 150° C.

The power switch 5 includes a gate terminal 7. A voltage at the gate terminal 7 is blocked by the gate blocking MOSFET 6 which receives the output signal from the temperature detecting electronic device 4. In other words, in the configuration of FIG. 7, the output signal is supplied from the temperature detecting electronic device 4 when the temperature of the temperature detecting electronic device becomes immediately below the level at which thermal destruction occurs (i.e., when the temperature reaches a predetermined detection temperature), so as to turn off the power switch 5. Thus, the overheating preventing function is performed.

The operation of the conventional temperature detecting electronic device 4 and the associated power switch 5 will be described in detail, hereinafter.

It is generally known that a forward voltage of a diode falls at the rate of about 2.5 mV/° C. as the temperature rises. The diode is conventionally used for temperature detection of such a characteristic. Since the six diodes in the diode group 1 are connected in series, the forward voltage reduces by a total of about 1.9 V(0.0025V/° C.×6×(150° C.−25° C.)=1.875 V) while the temperature rises from 25° C. to 150° C., at which over-heating is detected. In accordance with the reduction, the voltage of the power supply line 2 required to turn on the gate blocking MOSFET 6, i.e., a threshold voltage V2T to be applied to a gate of the gate blocking MOSFET 6 via the diode group 1 is also reduced by 1.9 V from 4.6 V to 2.7 V.

Accordingly, in the case where a voltage V2 of the power supply line 2 is set to 2.7 V, the gate blocking MOSFET 6 is turned on to turn off the power switch 5 at a temperature of 150° C. since the threshold voltage V2T and the voltage V2 become equal to each other at this temperature.

However, the above-mentioned conventional configuration has disadvantages as follows.

FIG. 8 is a graph illustrating the temperature characteristic of the conventional temperature detecting electronic device 4 shown in FIG. 7.

As illustrated in FIG. 8, the threshold voltage V2T crosses the voltage V2 of the power source line 2 at 150° C. which is the temperature to be detected, but the intersection of the threshold voltage V2T and the voltage V2 shifts when the forward voltage of the diode changes. Dotted lines in FIG. 8 represent the temperature characteristic obtained when the forward voltage of the diode group 1 changes by ±0.3 V (±0.05 V per diode). As can be appreciated from FIG. 8, when the forward voltage shifts by ±0.3 V, the temperature to be detected changes by ±22° C. This is because in the temperature range from 25° C. to 150° C. the difference between the threshold voltage V2T and the voltage V2 of the power source line 2 changes only slightly with respect to temperature change, and the variations in the forward voltage of the diode group 1 occupy 16% of the change in the difference.

In such a conventional temperature detecting electronic device for detecting the temperature using only the temperature characteristic of the forward voltage of the diodes, a gain with respect to the temperature (a change rate, i.e., sensitivity of the output voltage with respect to the temperature change) is small. Accordingly, the variations in the characteristics among components in the device significantly influence a change in the voltage in accordance with the temperature. As a result, the variations in the temperature to be detected are increased.

In order to suppress the variations in the temperature to be detected, the number of diodes may be increased to raise the gain with respect to the temperature change, or a high precision comparator may be used to reduce the factor causing the variations. However, the former has a problem that the number of diodes which can be connected in series is limited between a power supply line and a GND line since a low-voltage driving scheme is demanded. The latter has a problem of requiring use of a process for completely isolating devices such as a costly PN isolation process.

SUMMARY OF THE INVENTION

The electronic device for temperature detection of this invention includes: electronic control means which has a variable threshold voltage, that changes in accordance with temperature change, and outputs a control signal when a reference voltage corresponding to a detection reference temperature and the threshold voltage becomes equal to each other; and voltage supply means for varying the reference voltage in a positive direction in accordance with the temperature change and for outputting the varied reference voltage to the electronic control means. The electronic control means is configured such that the threshold voltage thereof is changed in a negative direction with respect to the temperature change.

According to the above configuration, when the temperature increases, the reference voltage supplied as the output voltage from the voltage supply means changes in a manner opposite to the change in the threshold voltage of the electronic control means, resulting in an increased gain of the voltage change with respect to the temperature change. As a result, adverse effects of the variations of the operations of constituent components on the change in the temperature to be detected is reduced. Consequently, the variations in the temperature to be detected is reduced.

Preferably, the voltage supply means includes: a first component having a negative temperature coefficient such that a voltage across terminals thereof changes in a negative direction with respect to the temperature change; and a second component having a positive temperature coefficient such that a voltage across terminals thereof changes in a positive direction with respect to the temperature change. The first and second components are connected with each other in series and configured so that an output voltage from a terminal between the first and second components is input to the electronic control means.

In one embodiment, in the voltage supply means, the first component includes a resistor made of polysilicon, and the second component includes a MOS-type transistor in which a drain electrode is connected to a gate electrode.

This makes it possible to output the increased reference voltage in accordance with the increase in temperature toward the electronic control means.

In another embodiment, in the voltage supply means, the first component includes a resistor made of polysilicon, and the second component includes a first MOS-type transistor in which a drain electrode is connected to a gate electrode. The electronic control means includes a resistor and a second MOS-type transistor. And a threshold voltage of the second MOS-type transistor included in the electronic control means is higher than that of the first MOS-type transistor included in the voltage supply means.

In the above configuration, both the voltage supply means and the electronic control means are constituted using the combination of components capable of being formed in the self-isolated structure, such as a polysilicon resistor and an MOS-type transistor. Thus, the electronic device for temperature detection which has a high sensitivity and less variations in the temperature to be detected can be produced without using such processes as the PN isolation process or the dielectric isolation process which are costly.

More preferably, the threshold voltage of the first MOS-type transistor included in the voltage supply means has a temperature coefficient with the same polarity as that of the second MOS-type transistor included in the electronic control means.

In the above configuration, even when the threshold voltages of the MOS-type transistors change due to the variations in the production parameters, the output voltage of the voltage supply means and the input threshold voltage of the electronic control means shift (i.e., offset) in the same manner. Thus, the variations in the temperature to be detected are suppressed.

An impurity concentration of a substrate surface in the vicinity of a source region of the second MOS-type transistor included in the electronic control means may be set higher than an impurity concentration of a substrate surface in the vicinity of a source region of the first MOS-type transistor included in the voltage supply means.

The above configuration allows a threshold voltage of the MOS-type transistor included in the electronic control means to be set higher than that of the MOS-type transistor included in the voltage supply means.

The electronic switching apparatus to be provided in accordance with another aspect of the present invention includes: an electronic device for temperature detection; a power switch; and a control section for controlling on-off operations of the power switch based on an output from the electronic device for temperature detection in order to prevent overheating. The electronic device for temperature detection included therein is the one having the above-mentioned features.

Thus, the electronic switching apparatus which incorporates therein the overheating protecting function and exhibits a precise control of on/off operations is provided.

In one embodiment, the power switch includes an MOS-type transistor, and the electronic device for temperature detection includes a resistor made of polysilicon and an MOS-type transistor connected with each other in series, and further, the power switch and the electronic device for temperature detection are formed on one substrate.

In the above configuration, by allowing the output supplied from the electronic device for temperature detection to be input into the control circuit of the power switch, the electronic switching apparatus with reduced variations in the operational functions can be realized at low cost.

Still another aspect of the present invention provides a method for producing an electronic switch apparatus including: an electronic device for temperature detection; a power switch; and a control section for controlling on-off operations of the power switch based on an output from the electronic device for temperature detection in order to prevent overheating. The method includes: a concentration adjusting step for setting an impurity concentration of a substrate surface in the vicinity of a source region of an MOS-type transistor in electronic control means included in the electronic device at a level higher than an impurity concentration of a substrate surface in the vicinity of a source region of an MOS-type transistor in voltage supply means included in the electronic device; and a well formation step for forming a well of the power switch. The concentration adjusting step and the well formation step are conducted simultaneously.

Thus, the variations in the temperature to be detected due to the variations in parameters in the production steps are significantly reduced.

An electronic device to be provided in accordance with still another aspect of the present invention includes: a low breakdown level region and a high breakdown region both formed in one substrate; a shallow well region formed beneath the low breakdown region; and a deep well region having the same conductivity as, but a higher impurity concentration than, the shallow well region, the deep well region being formed so as to be adjacent to and surround the shallow well region and reach a level deeper than the shallow well region.

Thus, the invention described herein makes possible the advantages of (1) providing an electronic device for detecting temperature which restricts variations in the temperature to be detected and is capable of operating at a low power supply voltage without increasing the production cost, and (2) providing an electronic switching apparatus, including such a temperature detecting electronic device, which incorporates therein an overheating preventing function with less variations in performance at low production cost, and further a method for producing such an electronic switching apparatus.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
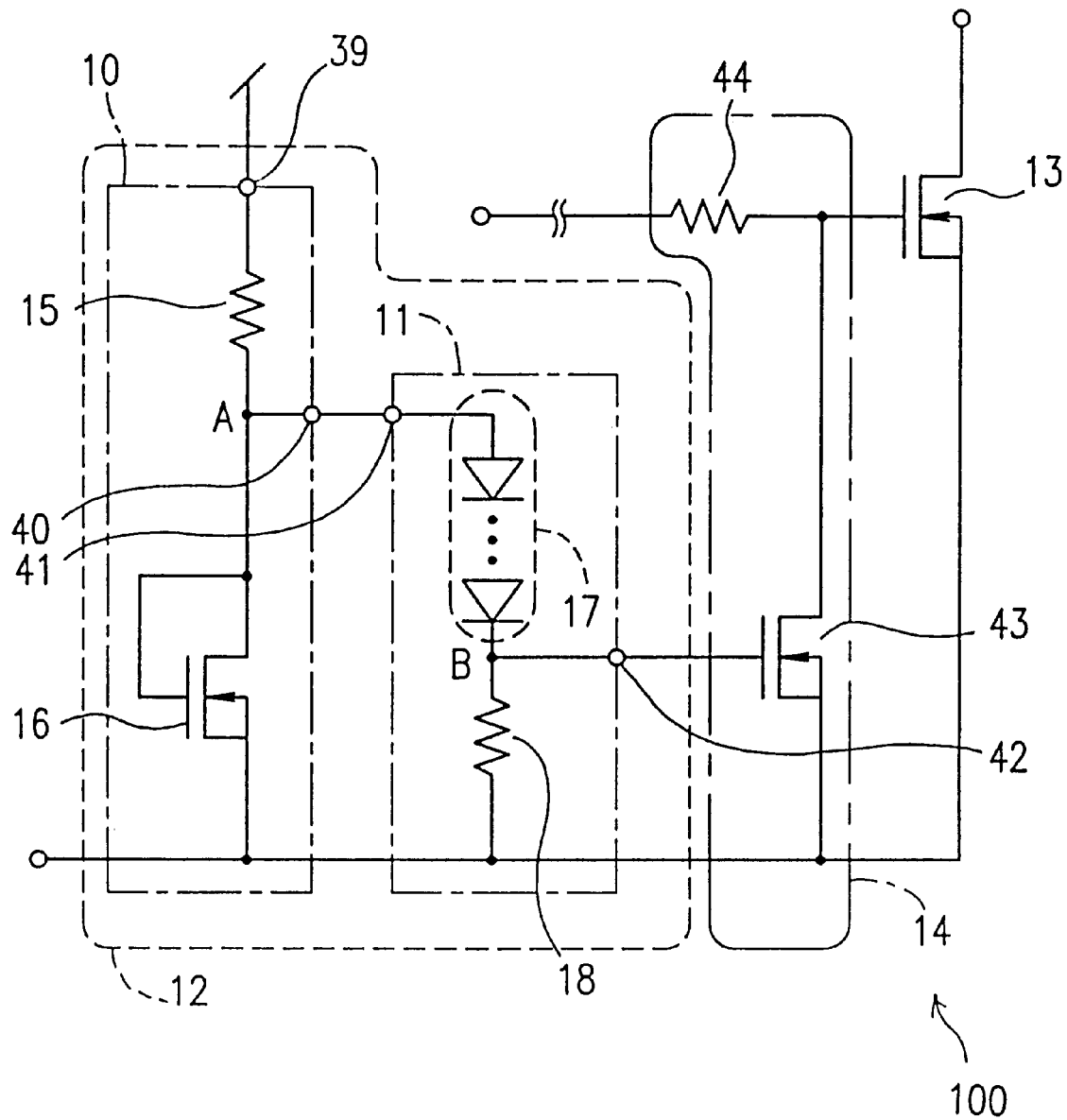
FIG. 1 is an equivalent circuit diagram of an electronic apparatus, i.e., an electronic switching apparatus including a temperature detecting electronic device in a first example according to the present invention.
Figure 2:
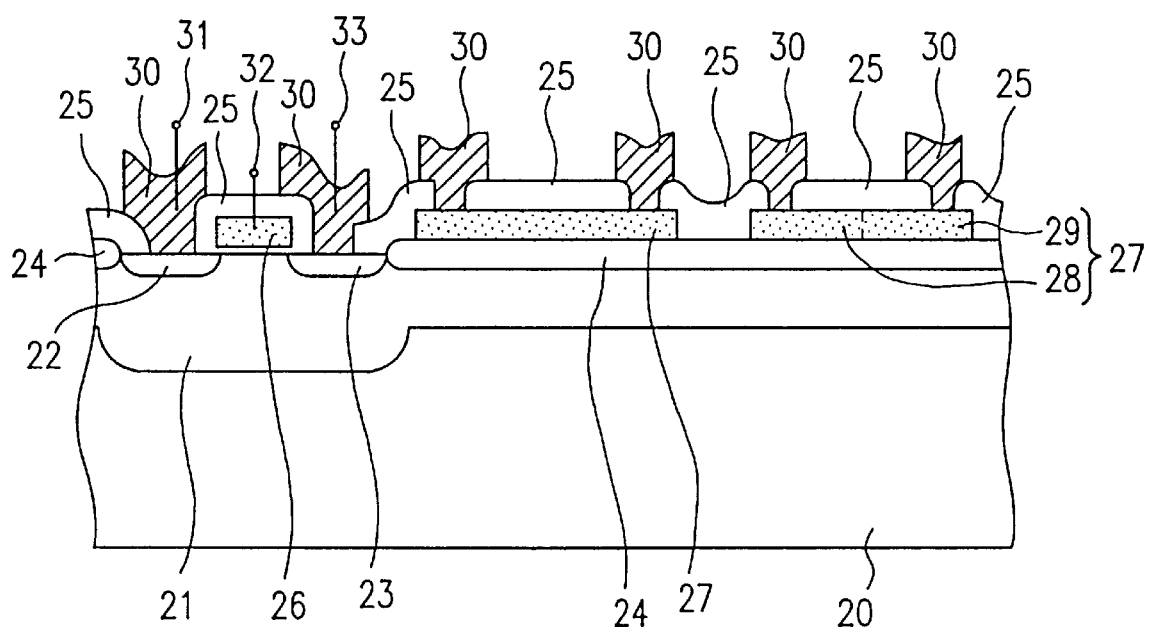
FIG. 2 is a cross-sectional view of a semiconductor apparatus fabricated as the temperature detecting electronic device shown in FIG. 1.

FIG. 1 is an equivalent circuit diagram of an electronic apparatus 100, specifically, an electronic switching apparatus 100 including a temperature detecting electronic device in a first example according to the present invention. The electronic switching apparatus 100 has an overheating preventing function. FIG. 2 is a cross-sectional view of a semiconductor device fabricated as a temperature detecting electronic device.

As shown in FIG. 1, the electronic switching apparatus 100 having an overheating preventing function includes a temperature detecting electronic device 12 (hereinafter, also referred to simply as the "electronic device"), a power switch 13, and a control section 14 for controlling the power switch 13. The electronic device 12 includes a voltage supply device 10 and a control device 11 for outputting a temperature detection signal to an element in the subsequent stage (hereinafter, also referred to simply as the "control device"). The power switch 13 is formed of a MOSFET.

The voltage supply device 10 includes a resistor 15 and a MOSFET 16. A drain terminal and a gate terminal of the MOSFET 16 are connected to the resistor 15. The control device 11 includes a polysilicon diode group 17 including a plurality of polysilicon diodes which are connected in series and a polysilicon resistor 18 connected in series to the polysilicon diode group 17.

Referring to FIG. 2, the semiconductor device, formed to act as an electronic device, includes an n-type epitaxial region 20, a p-type well 21, an n-type source region 22, an n-type drain region 23, an insulative layer 24, an interlevel insulative layer 25, a polysilicon gate layer 26, polysilicon layers 27, aluminum electrodes 30, a source electrode 31, a gate electrode 32, and a drain electrode 33.

The MOSFET 16 in the electronic device 12 shown in FIG. 1 is formed in, for example, the following manner.

On the n-type epitaxial region 20, the insulative layer 24 is selectively formed. The p-type well 21 is formed on a part of the n-type epitaxial region 20 which is not covered by the insulative layer 24. The polysilicon gate layer 26 is formed above the p-type well 21, and the n-type source region 22 and the n-type drain region 23 are formed on the p-well 21 using the polysilicon gate layer 26 as a mask. Then, the n-type source region 22, the n-type drain region 23 and the polysilicon gate layer 26 are covered by the interlevel insulative layer 25. Parts of the interlevel insulative layer 25 which correspond to the n-type source region 22 and the n-type drain region 23 are removed to partially expose the n-type source and drain regions 22 and 23, and the aluminum electrodes 30 are formed on exposed parts of the n-type source and drain regions 22 and 23. Thus, the aluminum electrodes 30 are respectively connected to the n-type source region 22 and the n-type drain region 23.

Next, the polysilicon resistor 15 and the polysilicon diode group 17 shown in FIG. 1 are formed in, for example, the following manner.

On the insulative layer 24 selectively formed on the n-type epitaxial layer 20, the polysilicon layer 27 is formed. In the polysilicon layer 27, an anode region 28 and a cathode region 29 are formed in contact with each other. Then, the polysilicon layer 27 including the anode region 28 and the cathode region 29 is covered by the interlevel insulative layer 25, and parts of the interlevel insulative layer 25 corresponding to parts of the polysilicon layer 27 which will act as terminals of the anode region 28 and the cathode region 29 are removed to partially expose the anode region 28 and the cathode region 29. Further aluminum electrodes 30 are formed on the exposed parts of the anode region 28 and the cathode region 29. Thus, the aluminum electrodes 30 are respectively connected to respective predetermined portions of the anode region 28 and the cathode region 29.

The operation of the voltage supply device 10 will now be described.

Returning to FIG. 1, the resistor 15 is formed of the polysilicon layer 27 (in FIG. 2) on the insulative layer 24 and thus has a negative temperature coefficient. The MOSFET 16 has a lateral structure as shown in FIG. 2. The gate electrode 32 and the drain electrode 33 (FIG. 2) are short-circuited and connected to the resistor 15 (i.e., the polysilicon layer 27). The gate-source voltage of the MOSFET 16 can have a positive or negative temperature coefficient in accordance with the drain current. In this example, the resistance of the resistor 15 is adjusted so that the gate-source voltage of the MOSFET 16 has a positive temperature coefficient.

An input terminal 39 of the voltage supply device 10 is one of two terminals of the resistor 15 (higher potential side of the resistor 15). An output terminal 40 is connected to point A (higher potential side of the MOSFET 16) at which the drain terminal and the gate terminal of the MOSFET 16 are connected with the resistor 15.

When the temperature rises in the state where the input terminal 41 of the control device 11 is supplied with a constant voltage, the resistance of the resistor 15 which is formed of polysilicon, falls. In other words, the inter-terminal voltage of the resistor 15 has a negative temperature coefficient. On the other hand, the gate-source voltage of the MOSFET 16 having a positive temperature coefficient increases as the temperature rises, and consequently, the voltage VOA at point A rises. As a result, the output voltage VOA of the voltage supply device 10 rises as the temperature rises.

The operation of the control device 11 will now be described.

The input terminal 41 is an anode terminal of the uppermost diode of the polysilicon diode group 17. The output terminal 42 is connected to point B connecting the polysilicon resistor 18 and the cathode terminal of the lowermost diode of the polysilicon diode group 17. When no current flows through the diode group 17, a "low" signal is output from the output terminal 42. When a current flows through the polysilicon diode group 17, a "high" signal is output from the output terminal 42.

When the voltage at the input terminal 41 rises at a certain temperature, the current starts flowing when the voltage at the input terminal 41 exceeds the total of the forward voltages of the polysilicon diode group 17, and the voltage VOA at the output terminal 42 rapidly rises. When the output voltage VOA rapidly rises, the state of the element in the subsequent stage is inverted. The input voltage (input threshold voltage) VIB required to invert the state of the element in the subsequent stage falls when the temperature rises because the temperature coefficient of the forward voltage of the polysilicon diode group 17 is negative. In other words, the input threshold voltage VIB of the control device 11 changes based on the negative temperature coefficient.

In the electronic device 12, the output terminal 40 of the voltage supply device 10 for outputting an output voltage VOA having a positive temperature coefficient is connected to the input terminal 41 of the control device 11 for receiving an input threshold voltage VIB having a negative temperature coefficient.

The control section 14 for the power switch 13 includes a gate blocking MOSFET 43 for controlling the gate voltage of the power switch 13 and a pull-down resistor 44. The control section 14 receives the output from the electronic device 12.

By providing the temperature detecting electronic device 12, the power switch 13 and the control section 14 on one semiconductor substrate, the electronic switching apparatus 100 incorporating an overheating preventing function therein is realized.

Hereinafter, a practical operation of the electronic switching apparatus 100 will be described.

In the voltage supply device 10, the resistance of the resistor 15 is 25 kΩ, and the threshold voltage of the MOSFET 16 is 1 V (VDS=5 V, IDS=1 μA where VDS represents the drain-source voltage and IDS represents the drain-source current). In the control device 11, the forward voltage of each polysilicon diode included in the polysilicon diode group 17 is 0.6 V, the number of the diodes included in the polysilicon diode group 17 is six, and the resistance of the resistor 18 is 200 kΩ.

As the gate blocking MOSFET 43, an n-channel MOSFET having a threshold voltage of 1 V is used. The drain terminal of the gate blocking MOSFET 43 is connected to a line which is connected to the gate of the power switch 13, and the gate terminal of the gate blocking MOSFET 43 is connected to the output terminal 42 of the control device 11, i.e., the output of the electronic device 12.

Due to such a structure, the electronic switching apparatus 100 has a function of preventing overheating of the MOSFET with the temperature to be detected being set at 150° C.

When a voltage of 5 V is applied to the input terminal 39 in the voltage supply device 10 at 25° C. the voltage VOA at point A stands at 2.1 V as a result of being divided between the resistor 15 and the MOSFET 16. The input threshold voltage VIB of the control device 11 is 4.6 V. Accordingly, a "low" signal is output from the electronic device 12, and the gate blocking MOSFET 43 is off.

When the temperature reaches 150° C. the resistance of the resistor 15 falls to increase the current, and the gate-source voltage of the MOSFET 16 increases. Therefore, the voltage VOA at point A rises to 2.7 V. The input threshold voltage VIB of the control device 11 falls to 2.7 V since the forward voltage of the polysilicon diode group 17 falls at the rate of 2.5 mV/° C. At this point, the gate blocking MOSFET 43 is turned on. The gate voltage of the power switch 13 falls due to the voltage drop of the pull-down resistor 44, and the power switch 13 is turned off.

In this manner, the function of preventing overheating of the MOSFET with the temperature to be detected as being set at 150° C. is realized.

Figure 3:
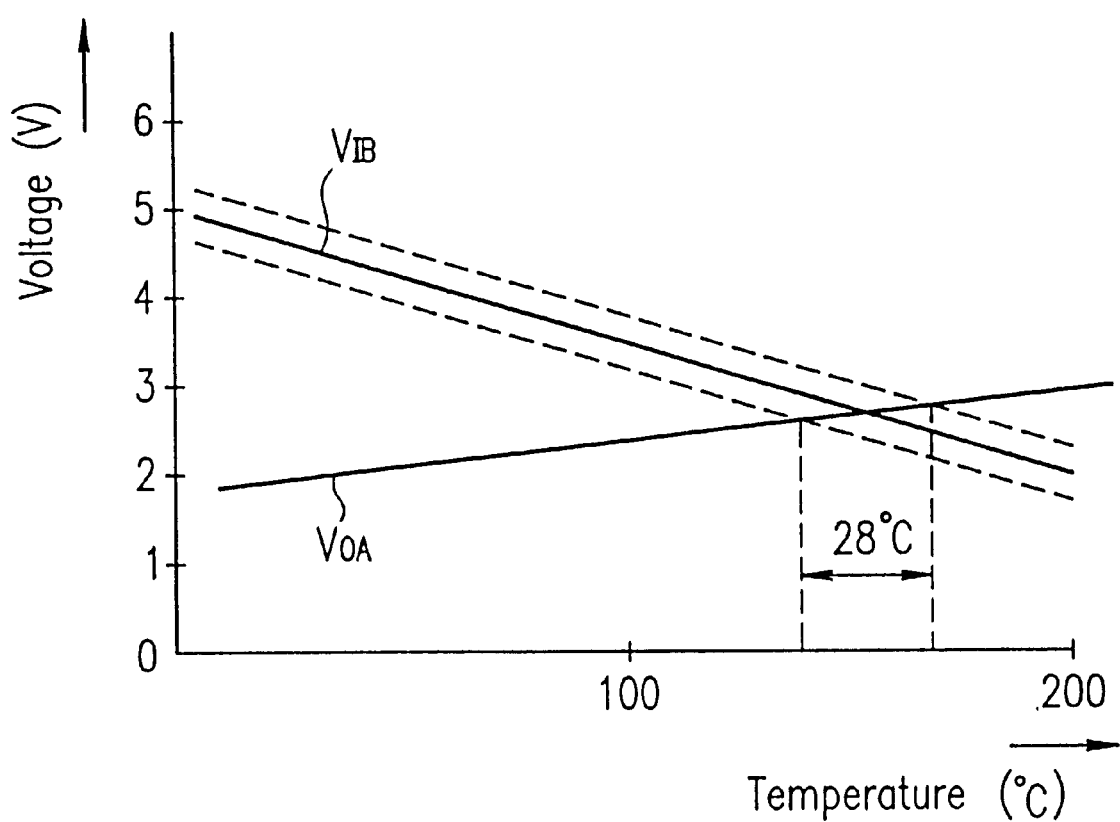
FIG. 3 is a graph illustrating the relationship between the output voltage of the voltage supply device and the input threshold voltage of the control device in the configuration shown in FIG. 1.

FIG. 3 is a graph illustrating the relationship between the output voltage VOA of the voltage supply device 10 and the input threshold voltage VIB of the control device 11.

As shown therein, the output voltage VOA of the voltage supply device 10 and the input threshold voltage VIB of the control device 11 are different from each other by 2.5 V at the temperature of 25° C. and are equal to each other at the temperature of 150° C. which is the temperature to be detected. Thus, the voltage difference changes by 2.5 V while the temperature rises from 25° C. to 150° C.

The dotted lines in FIG. 3 represent the above-mentioned relationship obtained when the total forward voltage of the polysilicon diode group 17 changes by ±0.3 V (±0.05 V per diode). The variations in the temperature to be detected are restricted to within ±14° C. in the vicinity of 150° C. This is because the gain with respect to the temperature of the configuration shown in FIG. 1 is larger than that in a conventional device.

In the first example, the gain with respect to the temperature increases by adding the voltage supply device 10 to the conventional structure of the temperature detecting electronic device 12. Therefore, the variations in the temperature to be detected are significantly reduced without increasing the number of diodes included in the polysilicon diode group 17. In consequence, the temperature detecting electronic device 12 has less variations in the temperature to be detected even in the case where the power supply voltage is relatively low.

The voltage supply device 10 for outputting a voltage having a positive temperature coefficient is realized by combining one polysilicon resistor 15 and one MOSFET 16. The temperature detecting electronic device 12 including such a voltage supply device 10 has less variations in the temperature to be detected even in the case where the power supply voltage is relatively low. Moreover, the electronic switching apparatus 100 incorporating therein an overheating preventing function with less variations is realized by allowing the output from the electronic device 12 to be input into the control section 14 for the power switch 13.

The voltage supply device 10 is formed only using such components as a polysilicon resistor 15 and an n-channel MOSFET 16, which can be formed to have a self-isolated structure. Thus, the electronic device 12 can be produced without using the PN isolation process or the dielectric isolation process which are costly.

In the first example, the voltage supply device 10 includes a combination of a polysilicon resistor 15 and a MOSFET 16. The voltage supply device 10 can include any other combination of components, or a single component, which provides a positive temperature coefficient. In any case, the same functions and advantages as set forth above can be obtained.

In addition, in the first example, a MOSFET is used as the power switch 13. Alternatively, an IGBT, a bipolar transistor or any other switching device can be used as the power switch 13, resulting in the same functions and advantages as set forth above.

EXAMPLE 2

Figure 4:
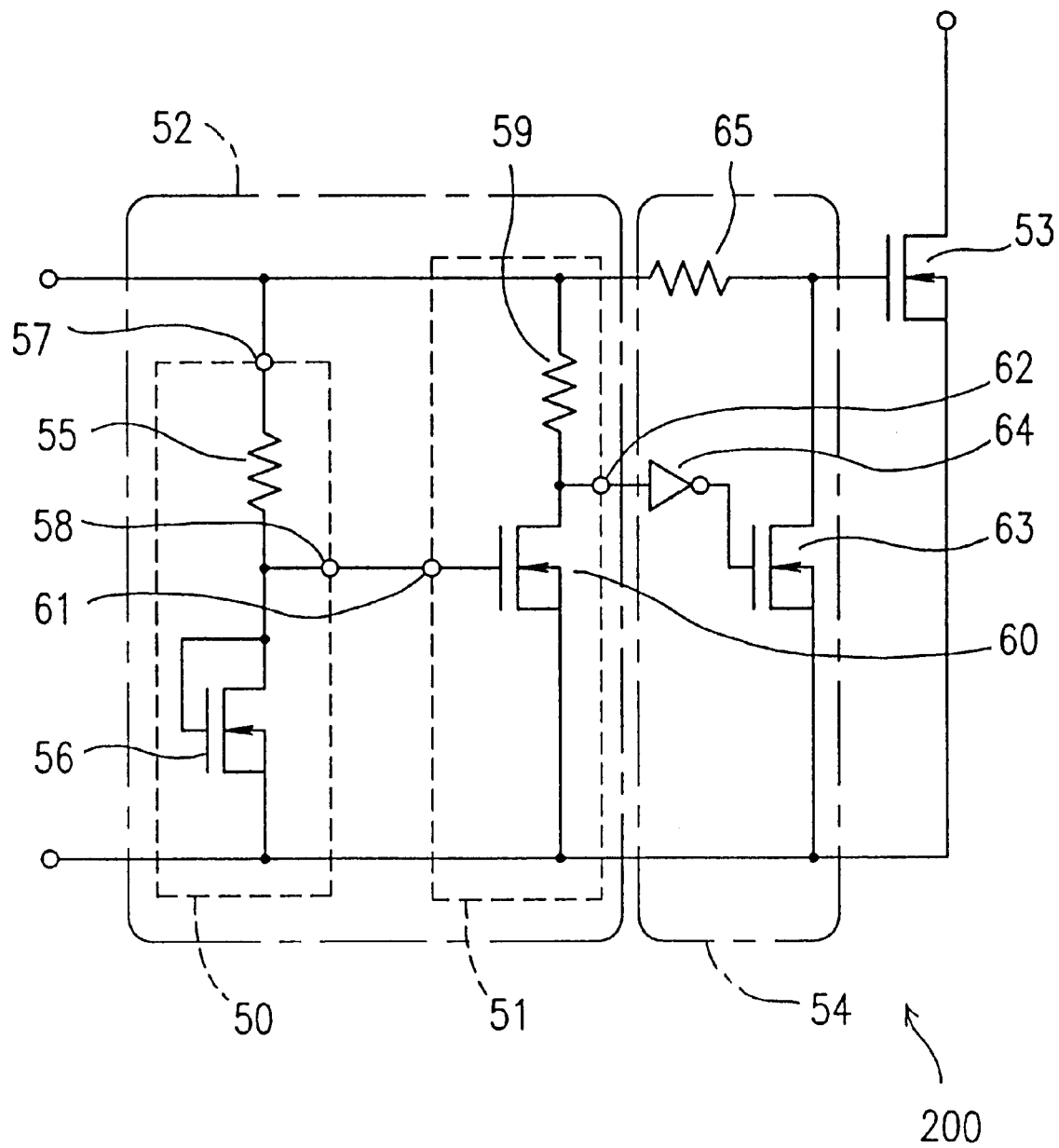
FIG. 4 is an equivalent circuit diagram of an electronic apparatus, i.e., an electronic switching apparatus including a temperature detecting electronic device in a second example according to the present invention.

FIG. 4 is an equivalent circuit diagram of an electronic apparatus 200, specifically, an electronic switching apparatus 200 including a temperature detecting electronic device in a second example according to the present invention. The electronic switching apparatus 200 incorporates therein an overheating preventing function.

As shown in FIG. 4, the electronic switching apparatus 200 having an overheating preventing function includes an electronic device 52, a power switch 53 and a control section 54 for controlling the power switch 53. The electronic device 52 includes a voltage supply device 50 and a control device 51 for outputting a temperature detection signal to an element in the subsequent stage. The power supply 53 is formed of a MOSFET.

The voltage supply device 50 includes a resistor 55 formed of polysilicon and a MOSFET 56. A drain terminal and a gate terminal of the MOSFET 56 are connected to the resistor 55. In the state where an input terminal 57 is supplied with a constant voltage, an output terminal 58 outputs a voltage having a positive temperature coefficient.

The control device 51 has a structure of a resistor-type inverter, in which a resistor 59 is connected to a drain terminal of a MOSFET 60. An input terminal 61 of the control device 51 is connected to a gate terminal of the MOSFET 60 in series, and an output terminal 62 of the control device 51 is connected to a connection point between the MOSFET 60 and the resistor 59. The threshold voltage of the MOSFET 60 is set to be higher than the threshold voltage of the MOSFET 56 in the voltage supply device 50. The resistance of the resistor 59 is adjusted to allow the input threshold voltage of the control device 51 to have a negative temperature coefficient.

The control section 54 for the power switch 53 includes a gate blocking MOSFET 63 for controlling the gate voltage of the power switch 53, an inverter 64, and a pull-down resistor 65. The output from the output terminal 62 of the electronic device 52 is inverted by the inverter 64 and then input to the gate of the gate blocking MOSFET 63.

In the second example, the threshold voltage of the MOSFET 56 is set at 1 V, and the threshold voltage of the MOSFET 60 is set at about 2.5 V. The resistor 59 is formed of polysilicon and has a resistance of 200 kΩ, so that the input threshold voltage of the control device 51 has a negative temperature coefficient.

Figure 5:
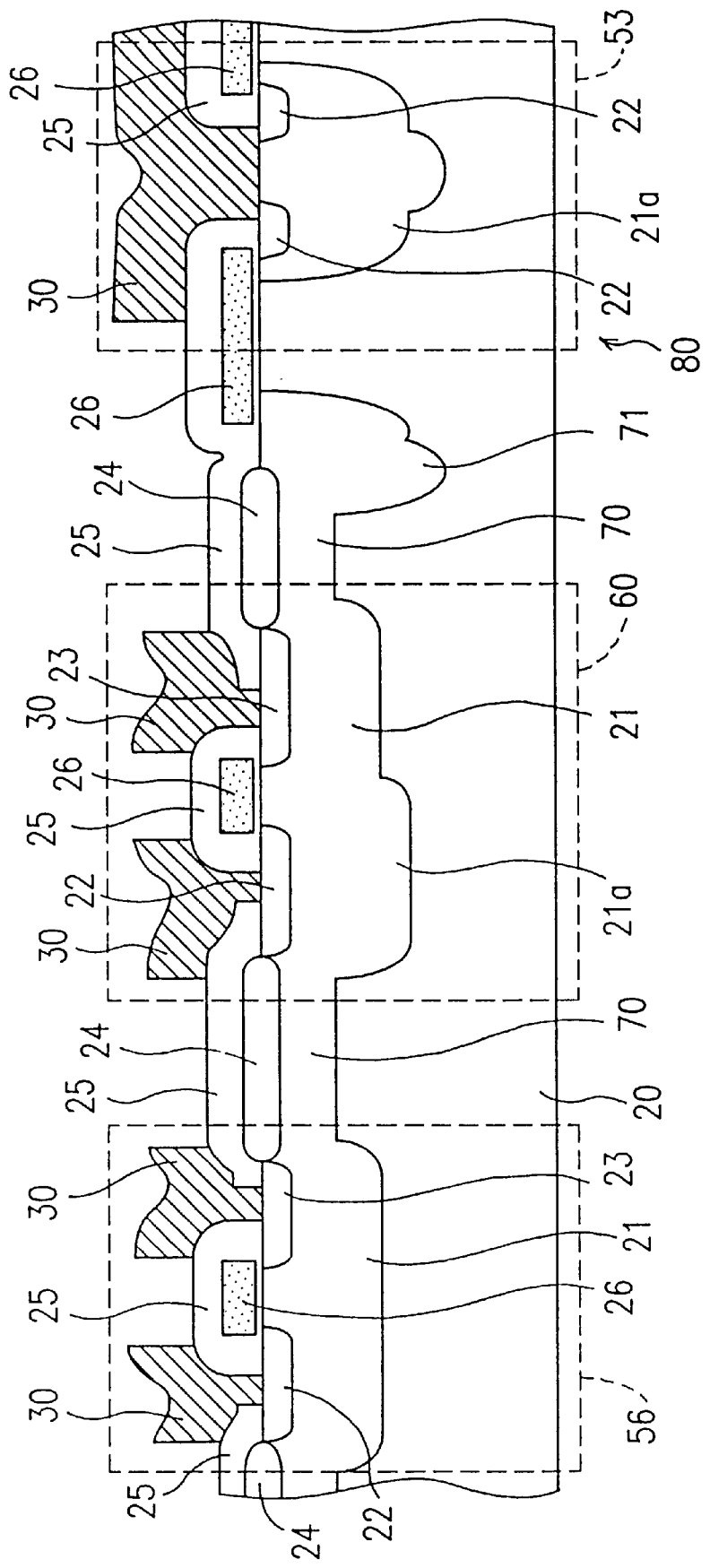
FIG. 5 is a cross-sectional view illustrating the configuration to be obtained when the MOSFETs realizing small signal logic function and a DMOSFET (vertical-type double diffusion MOSFET) functioning as a power switch in the configuration of FIG. 4 are integrally formed.
Figure 6:
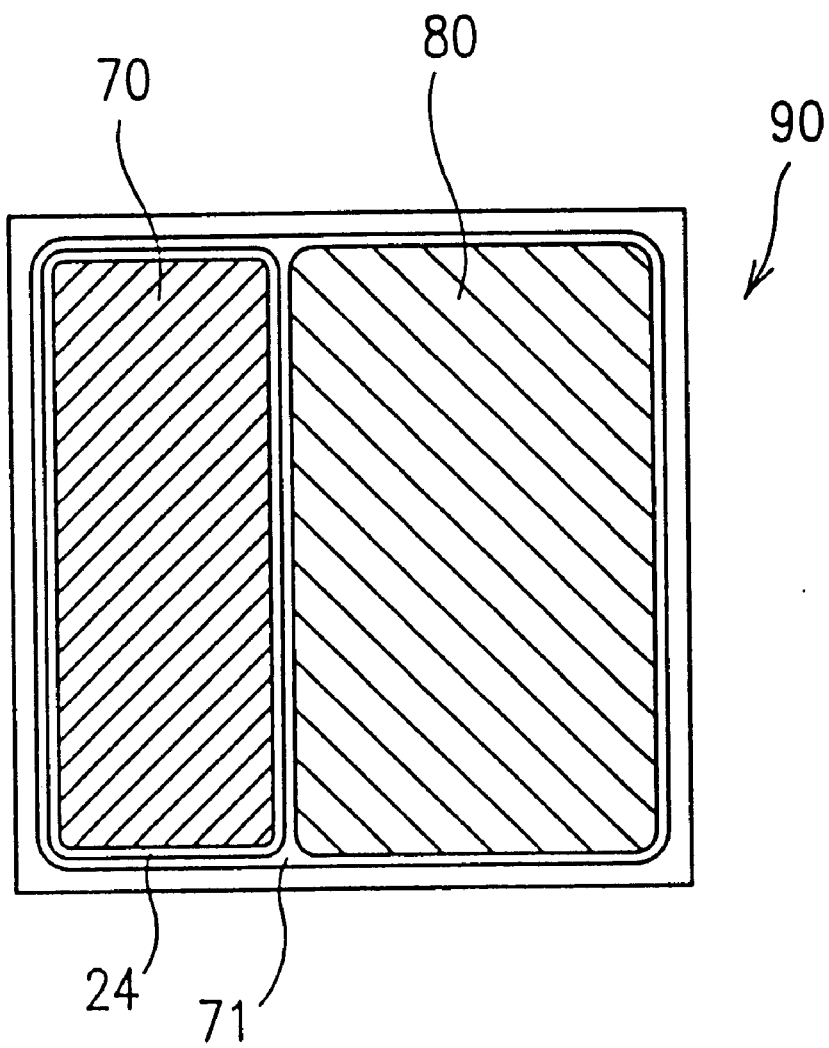
FIG. 6 is a plan view schematically illustrating a portion of the configuration of FIG. 4.
Figure 7:
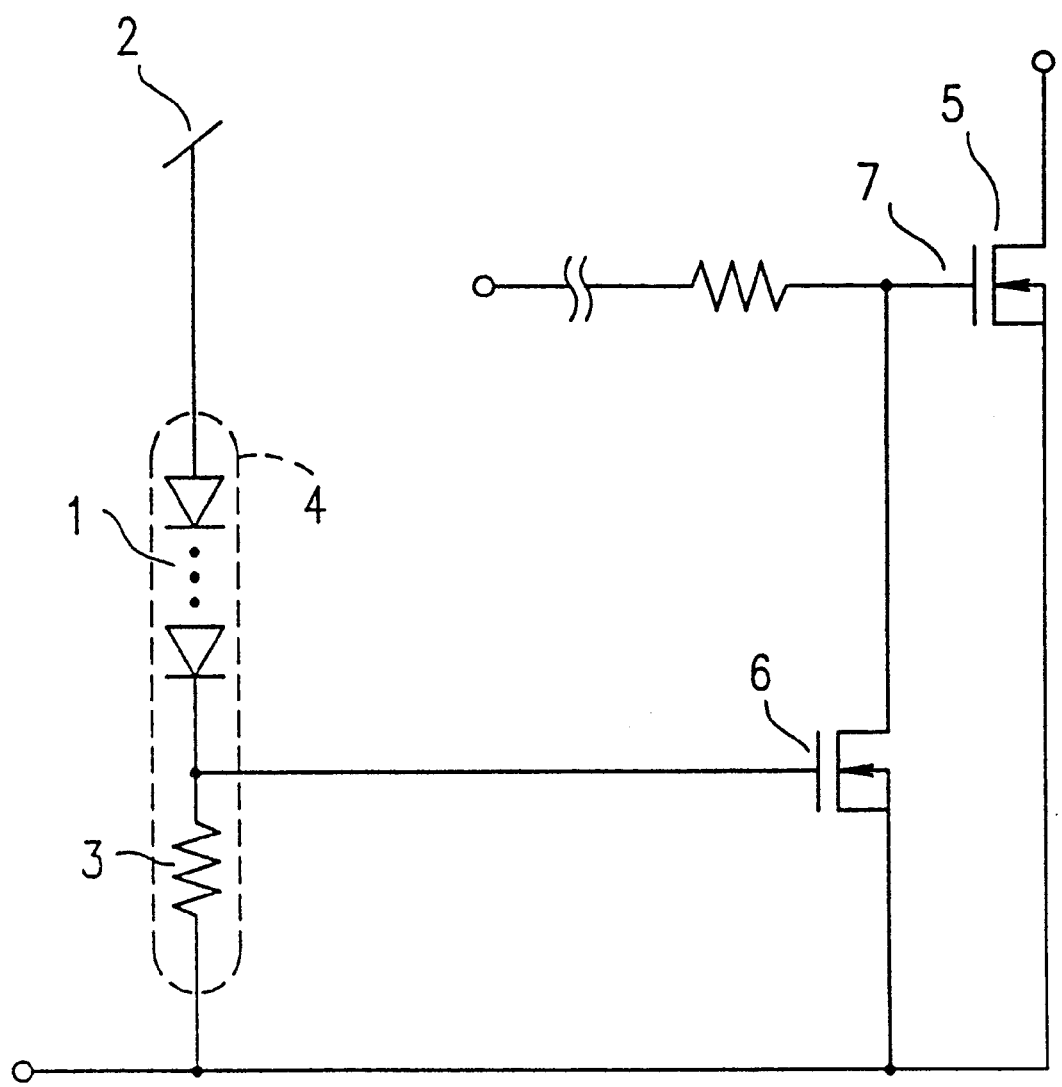
FIG. 7 is an equivalent circuit diagram of a conventional electronic switching apparatus which incorporates therein the overheating preventing function.
Figure 8:
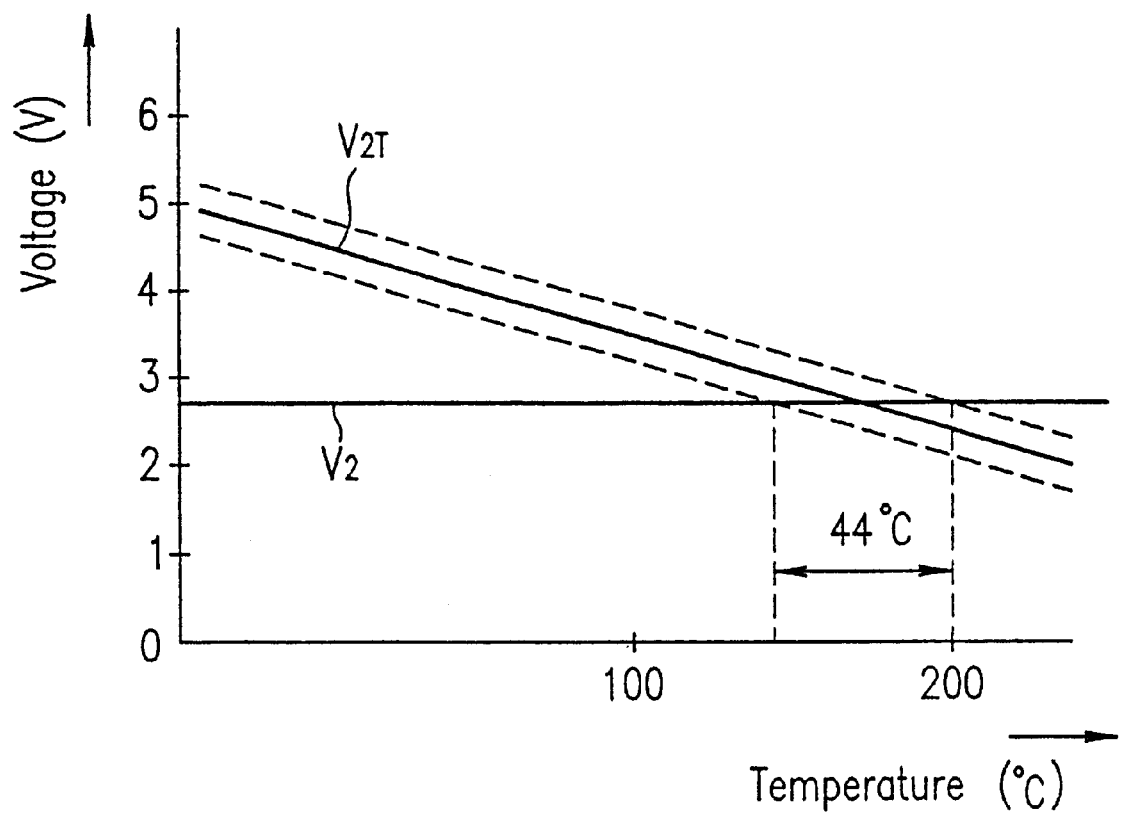
FIG. 8 is a graph illustrating the temperature dependency of the operational characteristics of the conventional electronic device for temperature detection shown in FIG. 7.

FIG. 5 is a cross-sectional view illustrating the configuration 90 to be obtained when the MOSFETs 56 and 60 realizing small signal logic function, and a DMOSFET 53 (vertical-type double diffusion MOSFET) functioning as the power switch 53 in the configuration of FIG. 4, are integrally formed. FIG. 6 is a plan view schematically illustrating a portion of the configuration of FIG. 4. Identical elements previously discussed with respect to FIG. 2 bear identical reference numerals and detailed descriptions thereof will be omitted.

The p-well 21 formed so as to surround the n-type source region 22 of the MOSFET 56 has a surface impurity concentration of about $3 \times 10^{16}$ cm$^{-3}$, and a p-well 21a, among a p-well region 21, formed so as to surround the n-type source region 22 of the MOSFET 60 has a surface impurity concentration of about $2 \times 10^{17}$ cm$^{-3}$, which is slightly higher than the surface impurity concentration of the p-well 21 for the MOSFET 56. Due to such a structure, the increased threshold voltage of the control device 51 is obtained. The gate blocking MOSFET 63 not shown in FIG. 5 is fabricated in the manner similar to that for the MOSFET 56.

An n-channel vertical-type DMOSFET 53 is used as the power switch 53. A p-well 21a formed so as to surround the n-type source region 22 in the DMOSFET 53 has an impurity concentration at substantially the same level as the surface impurity concentration of the p-well region 21a in the MOSFET 60.

In the present embodiment, an electronic switching apparatus 200 includes an electronic device 52 for temperature detection, a power switch 53, and a control section 54 for controlling on-off operations of the power switch 53 based on an output from the electronic device 52 in order to prevent overheating, wherein the power switch 53 and the electronic device 52 are formed on one semiconductor substrate. Upon the production of such an apparatus 200, the concentration adjusting step (for setting an impurity concentration of a substrate surface in the vicinity of a source region of an MOSFET 60 in the control device 51 included in the electronic device 52 at a level higher than that in the vicinity of a source region of the MOSFET 56 in the voltage supply device 50 also included in the electronic device 52) and the well formation step (for forming a well of the power switch 53) are conducted simultaneously.

When the MOSFETs 56 and 60 for the low-voltage operation and the DMOSFET 53 for the high-voltage operation are integrally formed on one semiconductor substrate as in the configuration of the present embodiment, it becomes important to prevent adverse effects of voltage variations or a voltage surge generated when the DMOSFET 53 operates from influencing the MOSFETs 56 and 60. Specifically, When a current flows in the vertical direction of the DMOSFET 53 to cause a substrate potential to be greatly fluctuated, the above disadvantages could often occur.

In order to overcome the above disadvantages, in accordance with the conventional technique, a shallow diffusion region is provided in the low-voltage region. However, with such a countermeasure, in the case of the vertical-type DMOSFET, a potential at the bottom surface of the substrate tends to be significantly varied at every switching timing, and furthermore, a surge noise is likely to be applied. When the diffusion region is broken down due to such a potential variation or a high-voltage surge, a potential drop is produced when a current flows in a surface electrode, resulting in malfunction of the device, e.g., due to adverse function of a parasitic transistor.

In view of the above the configuration 90 of the present embodiment, as shown in FIG. 5 or 6, includes a low breakdown level region and a high breakdown level region. The low breakdown level region at least includes the MOSFETs 56 and 60 realizing the low signal logic functions, the insulative film 24 for arranging the MOSFETs 56 and 60 in the isolated manner, a shallow well region 70 to be commonly connected to the region located beneath the insulative film 24 and the p-well regions 21 and 21a of the MOSFETs 56 and 60. The high breakdown level region 80 includes the DMOSFET 53 functioning as the power switch 53. The low breakdown level region and the high breakdown level region 80 are electrically isolated from each other by a deep p-well region 71 which is provided at least so as to surround the shallow p-well region 70 in the low breakdown level region. The deep p-well region 71 has an impurity concentration higher than that of the shallow p-well region, and reaches a lower position than the shallow p-well region. With respect to such electrical isolation, it is preferable to provide the deep p-well region 71 so as to surround not only the shallow p-well region in the low breakdown level region but also the DMOSFET 53.

The deep p-well region 71 is provided in the same process step as the p-well region 21a in the DMOSFET 53. Thus, the LOCOS insulative layer 24 above the position at which the deep p-well region 71 is to be provided is partially removed in order to form the deep p-well region 71 by diffusion technique. In addition, a diffusion depth of the deep p-well region 71 is substantially the same as that of the p-well region 21a of the DMOSFET 53, and furthermore, both wells 71 and 21a similar cross-sectional shapes. Accordingly, any local decrease in the breakdown level is not generated.

The insulative layer 24 is formed in the periphery of the low breakdown level region. The deep p-well region 71 is provided beyond the region where the insulative layer 24 is located towards the high breakdown level region 80. Thus, better electrical isolation between the low breakdown level region and the high breakdown level region 80 is achieved.

Thus, in accordance with the present invention, a surface impurity concentration of a peripheral area of a shallow diffusion region (i.e., the shallow p-well region 70) in the low-voltage region is set at a high level (in other words, the deep p-well region 71 is formed in such an area) and the diffusion region is connected to a predetermined electrode, so that a potential of the diffusion region (the well) is fixed. Specifically, by extending the region 71 having a higher impurity concentration at a deeper region, a potential in the well can be fixed at a deeper position.

Furthermore, when the deep p-well region 71 is provided so as to surround the low breakdown level region, the breakdown level with respect to the substrate is determined by a curvature of a junction surface between the substrate and the deep p-well region 71. Thus, even if a breakdown occurs, a current flows into a electrode portion through a well with a high impurity concentration, resulting in fewer malfunctions of the device.

In the present embodiment, a constant distance between the deep well region 71 and the high breakdown level region 80 is maintained. In addition, the deep well region 71 preferably has the same configuration as the low breakdown level region and the high breakdown level region 80.

Regarding the thickness of the gate oxide film which effects the threshold voltage most are made equal among the MOSFETs 56 and 60 by using oxide films having the same thickness and formed by the same process steps. As a result, the threshold voltages of the MOSFETs 56 and 60 have temperature coefficients of the same polarity and thus change in the same manner (i.e., an increasing manner or an decreasing manner). The MOSFETs 56 and 60 are formed in the same process steps except for the step of forming the p-well 21a surrounding the n-type source region 22 of the MOSFET 60. Accordingly, the threshold voltages of the MOSFETs 56 and 60 have temperature coefficients of the same polarity and thus change in the same manner, even when production parameters change.

Hereinafter, a practical operation of the electronic switching apparatus 200 will be described.

In the voltage supply device 50, when the resistance of the resistor 55 is 60 kΩ, the voltage at the output terminal 58 is 1.5 V in the state where the input terminal 57 is supplied with a voltage of 5 V. At this point, the voltage at the output terminal 58 has a positive temperature coefficient. The input threshold voltage of the control device 51 is about 2.5 V, which is the threshold voltage of the MOSFET 60. The input threshold voltage has a negative temperature coefficient.

At the temperature of 25° C. the input terminal 61 in the control device 51 is applied with a voltage of 1.5 V, which is less than the input threshold voltage. Thus, the voltage at the output terminal 62 is 0 V. Accordingly, a "high" signal is output from the electronic device 52 to be input into the control section 54. Since a "low" signal is input to the gate of the gate blocking MOSFET 63 via the inverter 64, the gate blocking MOSFET 63 is off.

When the temperature rises at this point, the output voltage from the voltage supply device 50 having a positive temperature coefficient rises, while the input threshold voltage of the control device 51 having a negative temperature coefficient falls. When the temperature reaches 150° C. the output voltage of the voltage supply device 50 and the input threshold voltage of the control device 51 become equal to each other (2.1 V). A "low" signal is output from the electronic device 52 and then input to the control section 54. A "high" signal (5 V) is applied to the gate of the gate blocking MOSFET 63 via the inverter 64 in the control section 54, thereby turning on the gate blocking MOSFET 63. Thus, the power switch 53 is turned off. In this manner, the function of preventing overheating of the MOSFET, with the temperature to be detected being set at 150° C. is realized.

Even when the threshold voltage of the MOSFET changes due to the variations in the production parameters, the threshold voltage of the MOSFETs 56 and 60 change in the same manner (i.e., increase or decrease) since they have the temperature coefficients with the same polarity. Accordingly, the output voltage of the voltage supply device 50 and the input threshold voltage of the control device 51 shift (offset) in the same manner. Thus, the variations in the temperature to be detected are suppressed.

In the second example, a resistor-type inverter is used in the control device 51, and the threshold voltage of the MOSFET 60 used for the resistor-type inverter is set higher than the threshold voltage of the MOSFET 56 used in the voltage supply device 50. By such a structure, the variations in the temperature to be detected caused by the variations in the parameters during the production process of the temperature detecting electronic device 52 are reduced.

Moreover, in the electronic device 50 including an n-channel vertical-type DMOSFET 53 as a power switch 53, the two MOSFETs 56 and 60 with different threshold voltages are formed using the p-well formation process of the DMOSFET 53. Such a method produces an electronic switching apparatus 200 incorporating therein an overheating preventing function with less variations in performance without adding any production step.

In a temperature detecting electronic device according to the present invention, an output terminal of a voltage supply device for outputting a voltage having a positive temperature coefficient is connected to an input terminal of an electronic control device having an input threshold voltage with a negative temperature coefficient. Due to such a structure, an electronic device for temperature detection with less variations in the temperature to be detected, capable of operating with a low power source voltage, is realized at low cost. In the case where a resistor-type inverter including a MOSFET with a higher threshold voltage than that of the MOSFET used for the voltage supply device is used as the electronic control device, the variations in the temperature to be detected caused by the variations in the production parameters are significantly reduced.

In accordance with the present invention, by combining a power switch with the electronic device for temperature detection, an electronic switching apparatus incorporating therein the overheating preventing function with less variations in performance is realized.

A method according to the present invention can produce an electronic switching apparatus incorporating therein an overheating preventing function with less variations in performance without adding any step.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electronic device for temperature detection, comprising:
    electronic control means which has a variable threshold voltage that changes in accordance with temperature change and outputs a control signal when a variable reference voltage corresponding to a detection reference temperature and the threshold voltage become equal to each other; and
    voltage supply means including a first component having a positive temperature coefficient such that a voltage across terminals thereof changes in a positive direction with respect to a temperature change, the first component including a first MOS-type transistor in which a drain electrode is connected to a gate electrode, the voltage supply means for varying the reference voltage in a positive direction in accordance with the temperature change and for outputting the variable reference voltage to the electronic control means, wherein the electronic control means is configured such that the threshold voltage thereof is changed in a negative direction with respect to the temperature change.

2. An electronic device according to claim 1 wherein the voltage supply means further includes:
    a second component having a negative temperature coefficient such that a voltage across terminals thereof changes in a negative direction with respect to the temperature change, wherein the first and second components are connected with each other in series and configured so that an output voltage from a terminal between the first and second components is input to the electronic control means.

3. An electronic device according to claim 2, wherein in the voltage supply means, the second component includes a resistor made of polysilicon.

4. An electronic device according to claim 2,
    wherein in the voltage supply means, the second component includes a resistor made of polysilicon, and the first component includes said first MOS-type transistor in which the drain electrode is connected to the gate electrode,
    wherein the electronic control means includes a resistor and a second MOS-type transistor, and
    wherein a threshold voltage of the second MOS-type transistor included in the electronic control means is higher than that of the first MOS-type transistor included in the voltage supply means.

5. An electronic device according to claim 4, wherein the threshold voltage of the first MOS-type transistor included in the voltage supply means has a temperature coefficient with the same polarity as that of the second MOS-type transistor included in the electronic control means.

6. An electronic device according to claim 4, wherein an impurity concentration of a substrate surface in the vicinity of a source region of the second MOS-type transistor included in the electronic control means is higher than an impurity concentration of a substrate surface in the vicinity of a source region of the first MOS-type transistor included in the voltage supply means.

7. An electronic switching apparatus, comprising:
    an electronic device for temperature detection;
    a power switch; and
    a control section for controlling on-off operations of the power switch based on an output from the electronic device for temperature detection in order to prevent overheating,
    wherein the electronic device for temperature detection is the one according to claim 1.

8. An electronic switching apparatus according to claim 7,
    wherein the power switch includes an MOS-type transistor, and the electronic device for temperature detection includes a resistor made of polysilicon and an MOS-type transistor connected with each other in series, and
    wherein the power switch and the electronic device for temperature detection are formed on one substrate.

9. A method for producing an electronic switching apparatus comprising: an electronic device for temperature detection; a power switch; and a control section for controlling on-off operations of the power switch based on an output from the electronic device for temperature detection in order to prevent overheating, the method comprising:
    a concentration adjusting step for setting an impurity concentration of a substrate surface in the vicinity of a source region of an MOS-type transistor in electronic control means included in the electronic device at a level higher than an impurity concentration of a substrate surface in the vicinity of a source region of an MOS-type transistor in voltage supply means included in the electronic device; and
    a well formation step for forming a well of the power switch,
    wherein the concentration adjusting step and the well formation step are conducted simultaneously.

10. An electronic device for temperature detection comprising:
    a low breakdown level region and a high breakdown level region both formed in one substrate;

a shallow well region formed beneath the low breakdown level region; and a deep well region having the same conductivity as, but a higher impurity concentration than, the shallow well region, the deep well region being formed so as to be adjacent to and surround the shallow well region and reach a level deeper than the shallow well region wherein the deep well region is formed between the low breakdown level region and the high breakdown level region.

11. An electronic device for temperature detection, comprising:

voltage supply means for varying a reference voltage in a positive direction in accordance with an increasing temperature change and outputting the varying reference voltage, the voltage supply means including a resistor made of polysilicon, and a first MOS-type transistor having a drain electrode and a first gate electrode; and a second MOS-type transistor having a second gate electrode, the second gate electrode being directly connected to the first gate electrode, wherein the threshold voltage of the second MOS-type transistor is higher than that of the first MOS-type transistor.

12. An electronic device for temperature detection according to claim 11, wherein the threshold voltage of the first MOS-type transistor has a temperature coefficient with the same polarity as that of the second MOS-type transistor.

13. An electronic device for temperature detection according to claim 11 wherein an impurity concentration of a substrate surface in the vicinity of a source region of the second MOS-type transistor is higher than an impurity concentration of a substrate surface in the vicinity of a source region of the first MOS-type transistor.

14. An electronic switching apparatus comprising:

an electronic device for temperature detection comprising: voltage supply means for varying a reference voltage in a positive direction in accordance with a temperature change and outputting the variable reference voltage, the voltage supply means including a resistor made of polysilicon, and a first MOS-type transistor having a drain electrode and a first gate electrode; and a second MOS-type transistor having a second gate electrode, the second gate electrode being connected to the first gate electrode, wherein the threshold voltage of the second MOS-type transistor is higher than that of the first MOS-type transistor;

a power switch; and a control section for controlling on-off operations of the power switch based on an output from the electronic device, for temperature detection, in order to prevent overheating.

* * * * *